Patented Feb. 4, 1941

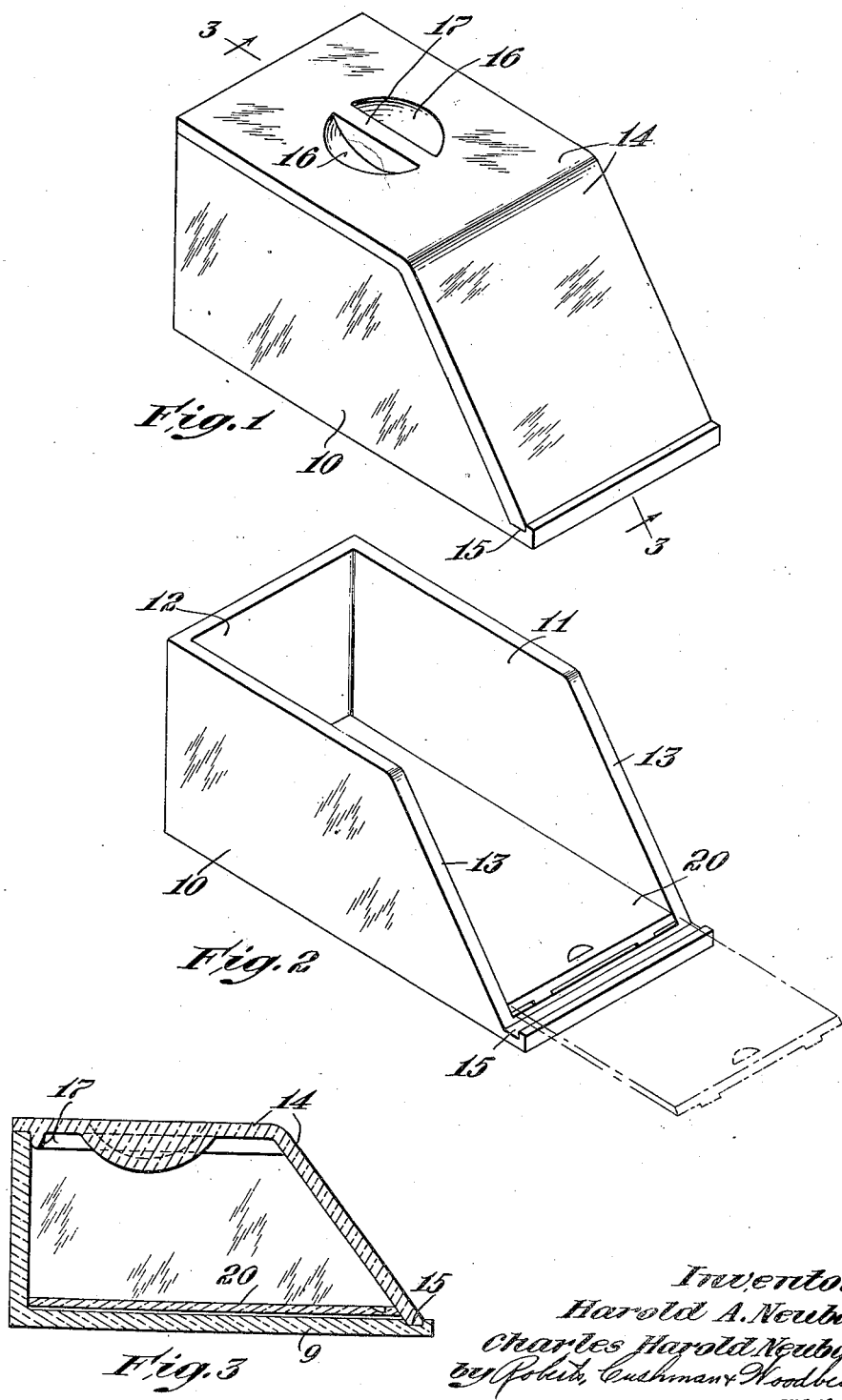

2,230,362

UNITED STATES PATENT OFFICE 2,230,362

COVERED DISH

Harold A. Neubauer, Palisade Park, N. J., and Charles Harold Neubauer, Braintree, Mass.; Frieda Neubauer, administratrix of H. A. Neubauer, deceased; said Frieda Neubauer assignor to said Charles Harold Neubauer Application May 2, 1939, Serial No. 271,326

9 Claims. (Cl. 65—59)

This invention relates to covered dishes suitable for butter, cheese, or other foods and is especially suitable for the storage of foods in refrigerators, particularly in hotels and restaurants where a large number of pieces of butter, cheese or other foods have to be kept in a refrigerator. In larger sizes the covered dish can be used for storing butter or other foods in a refrigerator or in the kitchen or pantry and in smaller sizes the covered dish may be used on the table for serving individual pieces of butter or cheese.

A principal object of the invention is to provide an improved covered dish within which the contents can easily be cut without removal of the whole contents from the dish, for example when the dish is in a refrigerator.

Further objects of this invention are to provide an improved covered dish well-suited for stacking in a refrigerator, which is easy to open thereby giving easy access to the contents, which is easy to clean, and in which the lid does not stick. Other objects of the invention and features of advantage and utility will be apparent from this specification and its drawing wherein the invention is explained by way of example.

In the drawing:

Fig. 1 is a perspective view of the dish and its cover;

Fig. 2 is a perspective view of the dish with its cover removed; and

Fig. 3 is a cross-sectional view of the dish on the line 3—3 of Fig. 1.

The dish which is indicated in the drawing as formed of glass, may be formed of any other suitable material, such for example as porcelain or metal or the various plastics suitable for use in dishes.

Referring to the drawing, Figs. 2 and 3 show the dish (with its cover removed in Fig. 2), having a bottom 9 (Fig. 3), two vertical walls 10 and 11 and a rear wall 12, and with one end and the top left open as shown in Fig. 2. The two vertical walls 10 and 11 which define the open end have inclined straight end edges 13, the major part of the open top defined by the upper edges of the walls 10, 11 and 12 being approximately level.

The cover 14 fits over the level portion of the top edge of the vertical side walls 10, and the inclined edges 13 as shown in Figs. 1 and 3. A ridge 17 along the side and rear edges of the inside surface of the cover 14 (Fig. 3) serves to prevent slipping of the cover to either side.

The bottom of the dish preferably extends beyond the inclined edges of the vertical side walls 10 and 11 at the open end of the dish and is there provided with a groove 15 (Fig. 2) into which the bottom edge of the inclined end of the cover 14 fits as shown in Figs. 1 and 3.

The cover 14 may be provided on its flat surface with indentations 16, 16, having a web 18 of the cover between them to provide a convenient handle for use in removing or replacing the cover.

The flat inclined surface of the cover provides a suitable space on which the name of a hotel or other insignia may be inscribed.

Preferably, particularly in dishes of larger size, there is provided a tray 20 of glass or other suitable material resting on and covering the bottom 9 and adapted to be slid forwardly wholly or partially out of the dish through the open front; thus the contents of the dish and tray can be removed from the dish without removing the entire dish from a refrigerator, or, if desired, the tray can be slid forwardly as shown in dotted lines in Fig. 2 to facilitate cutting the contents. The forward edge of the tray is preferably slanted at the same angle as the inclined front surface of the cover so that when the cover is closed, the tray is securely retained in place. This feature of a removable tray is also advantageous in use of the dish as a display receptacle in restaurants and delicatessens where by custom or law the food on display must be kept covered, but where it is advantageous to be able to remove the contents of the display receptacle easily. The removable tray renders it easy to keep the dish clean, since the food ordinarily touches only the tray which can easily be removed and washed separately.

An important advantage of our improved dish is that the lid may be readily removed and the butter or cheese or other contents then may easily be cut through the open end on the exposed flat surface of the tray 20 or bottom 9, for example while the dish is still in the refrigerator. It will be noted that there is no rim at the bottom front edge to interfere with cutting, and the knife edge can go down to the bottom of the dish. Unlike a flat dish with a bell-like cover whose bottom edges rest on the flat dish, the only place where it would be possible for the cover to stick to our improved dish would be at the front edge, and the cover can be easily pulled away from this one place.

Another advantage of our improved dish is that the feature of the flat top of the dish extending over the major portion of the dish permits the dish to be stacked with other similar dishes or with boxes, cans, etc. in the refrigerator, thus materially conserving space.

We claim:

1. A food receptacle comprising a dish and a cover therefor, the dish comprising bottom and vertical walls which leave an end and top open, the vertical walls which define the open end having inclined end edges, and the cover fitting the top and open end and interfitting with the bottom wall.

2. A food receptacle comprising a dish and a cover therefor, the dish comprising bottom and vertical walls which leave an end and top open, the vertical walls which define the open end having inclined end edges, and the cover fitting the top and open end and interfitting with the bottom wall, and a tray substantially covering the bottom wall and slidable out through the open end when the cover is removed.

3. A food receptacle comprising a dish and a cover therefor, the dish comprising a bottom and vertical walls which leave an end and top open, the vertical walls which define the open end having inclined end edges, the major part of the open top being approximately level, and a cover fitting the level portion of the top and said inclined end edges and being approximately level over the major part of the dish.

4. A food receptacle comprising a dish and a cover therefor, the dish comprising a bottom and vertical walls which leave an end and top open, the vertical walls which define the open end having inclined edges, the major part of the open top being approximately level, and a cover fitting the level portion of the top and said inclined end edges and being approximately level over the major part of the dish, the bottom extending outwardly beyond the open end and interfitting with the cover.

5. A food receptacle comprising a dish and a cover therefor, the dish comprising a bottom and vertical walls which leave an end and top open, the vertical walls which define the open end having inclined end edges, the major part of the open top being approximately level, and a cover fitting the level portion of the top and said inclined end edges and being approximately level over the major part of the dish, the bottom extending outwardly beyond the open end and having a recess for receiving the edge of the cover.

6. A food receptacle comprising a dish and a cover therefor, the dish comprising a bottom and vertical walls which leave an end and top open, the vertical walls which define the open end having inclined end edges, the major part of the open top being approximately level, and a cover fitting the level portion of the top and said inclined end edges and being approximately level over the major part of the dish, the bottom extending outwardly beyond the open end and interfitting with the cover, the outwardly projecting portion of the bottom extending substantially no higher than the level of the bottom within the receptacle thereby to facilitate cutting of the contents.

7. A food receptacle comprising a dish and a cover therefor, the dish comprising bottom and vertical walls which leave an end and top open, the vertical walls which define the open end having inclined end edges, and a cover fitting the top and inclined end edges and being approximately level over the major part of the dish, the bottom extending outwardly beyond the open end and interfitting with the cover, the outwardly projecting portion of the bottom extending substantially no higher than the level of the bottom within the receptacle thereby to facilitate cutting of the contents.

8. A food receptacle comprising a dish and a cover therefor, the dish comprising bottom and vertical walls which leave an end and top open, the vertical walls which define the open end having inclined end edges, a slidable tray within the dish, and a cover fitting the top and end, the bottom wall of the dish being recessed to receive the forward lower edge of the cover.

9. A food receptacle comprising a dish and a removable cover therefor, the dish comprising bottom and vertical walls which leave an end and top open, the vertical walls which define the open end having inclined edges, a tray substantially covering the bottom of the dish and slidable out the open end of the dish, the cover fitting the top and open end and interfitting with the bottom of the dish thereby to retain the tray in place.

HAROLD A. NEUBAUER.
CHARLES HAROLD NEUBAUER.